(12) United States Patent
Agrawal et al.

(10) Patent No.: US 12,384,408 B2
(45) Date of Patent: Aug. 12, 2025

(54) METHOD FOR VISUAL DETECTION AND POSITION ESTIMATION OF ROAD FLARES

(71) Applicant: GM Cruise Holdings LLC, San Francisco, CA (US)

(72) Inventors: Pranay Agrawal, San Jose, CA (US); Ashish Shrivastava, San Jose, CA (US); Robert Liang, San Francisco, CA (US); Changkai Zhou, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 253 days.

(21) Appl. No.: 18/176,413

(22) Filed: Feb. 28, 2023

(65) Prior Publication Data

US 2024/0286636 A1    Aug. 29, 2024

(51) Int. Cl.
*B60W 60/00* (2020.01)
*B60W 40/02* (2006.01)
*G06T 7/50* (2017.01)
*G06T 7/70* (2017.01)
*G06V 10/774* (2022.01)
*G06V 20/56* (2022.01)
*G06V 20/70* (2022.01)
*G08G 1/09* (2006.01)

(52) U.S. Cl.
CPC .......... *B60W 60/001* (2020.02); *B60W 40/02* (2013.01); *G06T 7/50* (2017.01); *G06T 7/70* (2017.01); *G06V 10/774* (2022.01); *G06V 20/588* (2022.01); *G06V 20/70* (2022.01);
*G08G 1/09* (2013.01); *B60W 2554/00* (2020.02); *G06T 2207/20084* (2013.01); *G06T 2207/30252* (2013.01)

(58) Field of Classification Search
CPC .............. B60W 60/001; B60W 40/02; B60W 2554/00; G06T 7/50; G06T 7/70; G06T 2207/20084; G06T 2207/30252; G06V 20/70; G06V 10/774; G06V 20/588; G08G 1/09
See application file for complete search history.

(56) References Cited

U.S. PATENT DOCUMENTS 9,727,795 B1 *   8/2017  Lo ........................... G06F 18/22
12,026,956 B1 *  7/2024  Purdy ....................... G06T 7/20

\* cited by examiner

*Primary Examiner* — Andrew J Cromer
(74) *Attorney, Agent, or Firm* — CANTOR COLBURN LLP

(57) ABSTRACT

The disclosed technology provides solutions for applying a flare detection model to an image for detecting road flares in an environment by an autonomous vehicle (AV). A method comprises accessing a flare detection model that is trained to recognize a bounded outer region and a bounded inner region; and detect a flare object within the bounded inner region and refrain from detecting an object in the bounded outer region; applying the flare detection model to an image of the environment to recognize an outer region corresponding to a glow of a flare and an inner region that corresponds to the flare in the environment; and detecting the flare in the environment within the inner region based on the inner region being recognized by the flare detection model and contained within the outer region that is also recognized by the flare detection model. Systems and machine-readable media are also provided.

18 Claims, 8 Drawing Sheets

METHOD FOR VISUAL DETECTION AND POSITION ESTIMATION OF ROAD FLARES

BACKGROUND

1. Technical Field

The present disclosure generally relates to detecting road flares in an environment by an autonomous vehicle (AV) and, more specifically, applying a flare detection model to an image of the environment to recognize an outer region corresponding to a glow of the flare in the environment and an inner region that corresponds to the flare.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
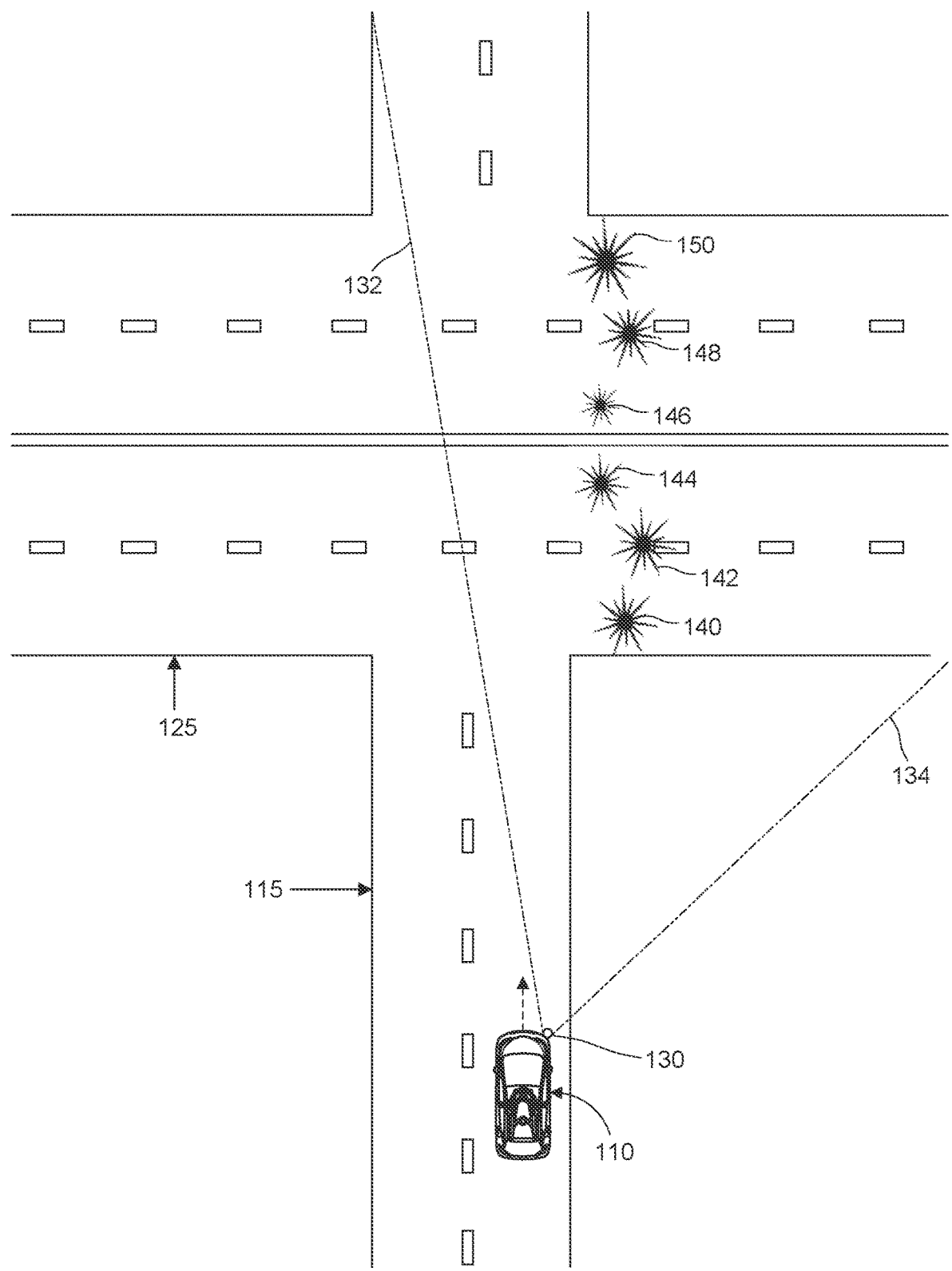
FIG. 1 is a perspective view of an example autonomous vehicle (AV) travelling along a first roadway that intersects a second roadway with road flares, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as described in more detail below. The sensor systems can include one or more types of sensors that can be arranged about the AV, including but not limited to camera sensors. In some examples, the AV can interpret sensor signals to detect and classify objects in the environment using a perception stack, as explained in more detail below. The perception stack can enable the AV to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems as well as other data sources. In some examples, the AV controller relies on the correct detection and classification of the objects in the AVs environment to subsequently provide commands for the actuators that control the AV's steering, throttle, brake, and drive unit. It is therefore crucial that the AV's perception stack can correctly detect and classify objects in the AV's environment so that the AV planner and controller can determine a plan and controls for implementing the plan for controlling the AV in a safe and effective manner.

Flares are one example of an object that is encountered by an AV and can be detected and classified by the AV's perception stack. In some examples, a flare can be a fire or blaze of light located on the roadway that is commonly used to signal to drivers that a roadway or other drivable area (such as a parking lot, for example) is closed to traffic. In some examples, flares can be a temporary indication that the roadway is closed, rather than a permanent indicator of a closed roadway such as a sign, gate, or roadblock (among other examples). In some examples, flares can be used by police or emergency personnel to indicate that a roadway is temporarily closed. In some examples, flares can be placed on the roadway (sometimes hastily) by humans quickly during an emergency and therefore can be placed in a non-uniform pattern on the roadway. Additionally, unlike other objects in the AV's environment, the glow of a flare can be continuous and lack a defined border. Therefore, in some examples, flares can be difficult to detect and classify using previous methods due to both the unique character of the continuous glow as well as the unpredictable, non-uniform pattern created by a human placing the flares during an emergency.

In some examples, it can also be difficult for the AV's perception stack to detect and classify a road flare because the flare itself can be too small. In some cases, the flare can be too small to fill an entire detectable cell. Additionally, it can be difficult for the perception stack to determine the border of a flare, and in some examples, the perception stack can incorrectly detect other flares within the glow of the flare that has been sensed by the AV's sensor. Therefore, a method of detecting and classifying flares that overcomes these challenges is contemplated herein by way of training a machine learning model to detect and classify flares in an improved way, and subsequently implanting that machine learning model into the AV's perception stack. As discussed in more detail below, AVs can include an Artificial Intelligence/Machine Learning (AI/ML) platform that can provide the infrastructure for training and evaluating machine learning algorithms for operating the AV. In some examples, a machine learning algorithm can be trained to detect and classify flares by applying two bounding boxes to the detected flare as described in more detail below.

In some cases it can also be important for the AV to know the pattern created by the placement of multiple flares located on a roadway and further to understand what this pattern means in the context of the environment. In some examples, known mesh height maps of the location can be combined with captured images of the flares to determine the precise location of each flare in the environment. This knowledge can be useful to the AV to understand the context of the flares and how to navigate in their presence. For example, a row of flares arranged in a generally straight line blocking one direction at an intersection can indicate that that direction is closed to traffic, while the other three directions at the intersection remain open to traffic. In some examples, flares arranged in a generally straight line can indicate that the flares have been purposefully placed to indicate a road closure. In some examples, the locations of the flares can be compared to semantic map information of the same location to determine whether known information about that specific location can be used to infer the purpose of the flares. Once the AV correctly detects a row of flares and determines, based on the location and semantic map information, the likely purpose of the flares (i.e., to block a roadway, for example), the AV's controller can reroute the AV along a different channel to avoid the closed roadway.

FIG. 1 is a perspective view of an example AV 110 travelling along a first roadway 115 (in the direction indicated by the arrow) that intersects a second roadway 125 comprising road flares 140, 142, 144, 146, 148, and 150 blocking one direction of travel. In some examples, AV 110 can comprise a sensor 130 with a field of view (FOV) located between dotted line 132 and dotted line 134. Although not illustrated in FIG. 1, in some examples, AV 110 can comprise multiple sensors. As discussed in more detail below, AV 110 can comprise multiple sensor systems, including different types of sensors arranged about the AV 110. For instance, the sensor systems can include, but are not limited to, one or more: Inertial Measurement Units (IMUs), cameras (e.g., still image cameras, video cameras, etc.), optical sensors (e.g., LIDAR systems, ambient light sensors, infrared sensors, etc.), Radio Detection and Ranging (RADAR) systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. Other embodiments may include any other number and type of sensors.

As AV 110 travels along first roadway 115, the sensors positioned around AV 110 (for example, sensor 130 in FIG. 1), can generate signals that enable a perception stack (discussed in more detail below with regard to FIG. 6) to detect and classify objects and determine their current locations, speeds, directions, and the like. In some examples, an output of the perception stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). For example, as AV 110 approaches second roadway 125, road flares 140, 142, 144, 146, 148, and 150 located on second roadway will come into the FOV of the sensor 130 positioned on AV 110 as shown in FIG. 1.

While most objects that the AV 110 can encounter in the environment are larger than a single pixel and also have defined borders, road flares (i.e. road flares 140, 142, 144, 146, 148, and 150) are unique because they can be smaller than a single pixel and also comprise a smooth continuous glow that lacks a defined border. These properties can be unique to road flares and can cause difficulties for the perception stack attempting to output a bounding area around the flare lacking a defined border. Additionally, in some examples, the road flares (i.e. road flares 140, 142, 144, 146, 148, and 150) can be arranged non-linearly and also comprise various sizes and brightness values. For example, road flares 140, 142, 144, 146, 148, and 150 illustrated in FIG. 1 are not arranged in a straight line, and additionally road flare 150 is larger (and brighter) than road flare 146. The non-linear nature of the placement of the road flares 140, 142, 144, 146, 148, and 150 combined with the various sizes of the road flares can cause difficulties for the AV 110 in accurately determining the purpose of the road flares 140, 142, 144, 146, 148, and 150 and subsequently how the AV 110 should react when encountering the road flares. A solution to the first difficulty (i.e. road flares lack a defined border and therefore can cause difficulties for the perception stack attempting to output a bounding area around the flare) will be discussed in more detail with regard to FIG. 2. A solution to the second difficulty (i.e. non-linear nature of the placement of the road flares combined with the various sizes of the road flares can cause difficulties for the AV in accurately determining the purpose of the road flares and subsequently how the AV should react when encountering the detected road flares) will be discussed in more detail with regard to FIGS. 3 and 4.

Figure 2:
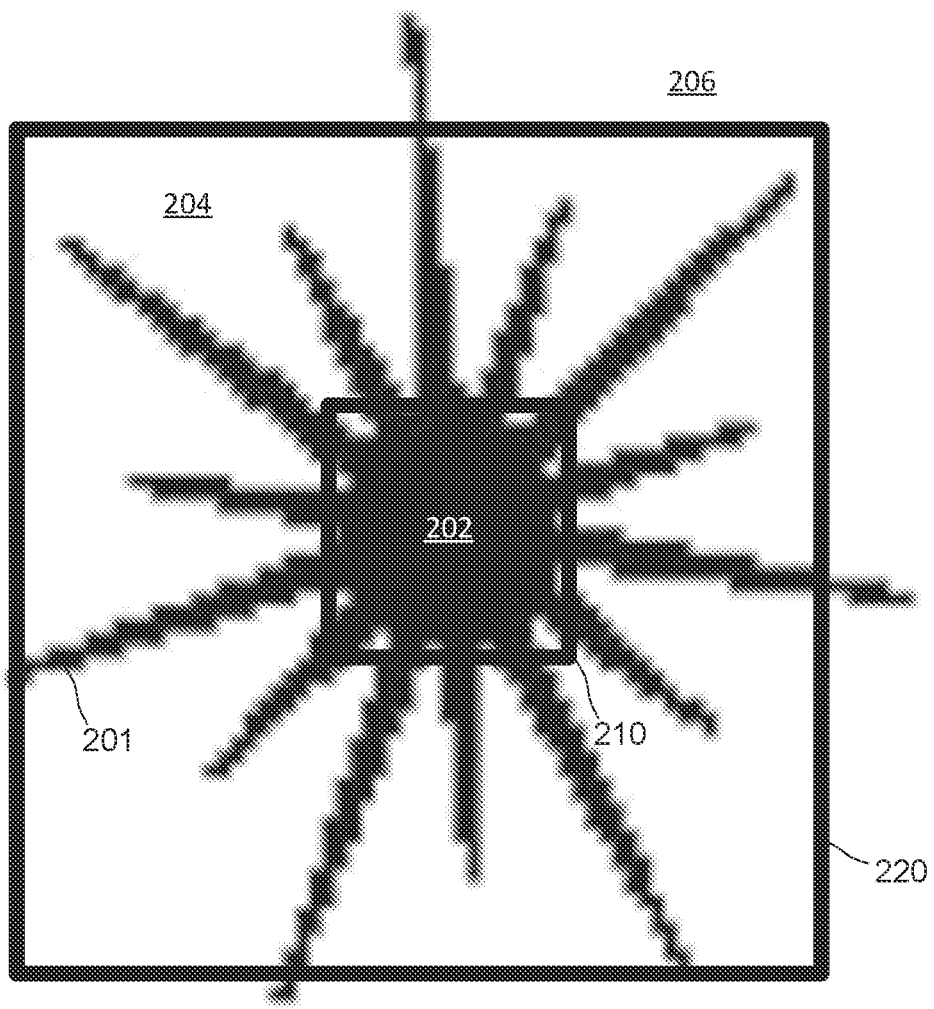
FIG. 2 illustrates an example image of a road flare captured by a sensor mounted on an AV comprising bounding boxes, according to some examples of the present disclosure.

FIG. 2 illustrates an example image of a road flare 201 captured by a sensor 130 mounted on an AV 110 comprising bounding boxes 210 and 220. As discussed in more detail below, AV 110 can include an Artificial Intelligence/Machine Learning (AI/ML) platform that can provide the infrastructure for training and evaluating machine learning algorithms for operating AV 110. In some examples, a machine learning algorithm can be trained to detect and classify flares by applying two bounding boxes (i.e. bounding box 210 and bounding box 220) to an image of the detected flare as shown in FIG. 2.

In most cases, when detecting most other objects in the AV 110's environment (i.e., objects with a defined border), an output of the perception stack can be a single bounding box around the perceived object that can be associated with a semantic label that identifies the type of object that is within the bounding box. In the example of a road flare, after a bounding box has been applied by the perception stack, the perceived object (i.e., flare 201) can be associated with a semantic label that identifies it as a road flare. However, due to the nature of the road flare's smooth continuous glow, the perception stack can sometimes correctly label the road flare but can also erroneously label various portions of the glow of the road flare as additional road flares (i.e., road flares that are not present in the environment).

Therefore, when detecting a road flare 201 in the AV 110's environment (i.e., objects that lack a defined border), the machine learning algorithm can be trained so that an output of the perception stack can include two bounding boxes as illustrated in FIG. 2. For example, FIG. 2 shows road flare 201 bounded by first bounding box 210 as well as second bounding box 220. FIG. 2 shows that first bounding box 210 can be approximately placed around the flare 201 itself (i.e. as close as possible to bounding only the road flare 201 in view of the unique nature of the smooth continuous glow of the road flare 201 that makes it difficult to be precise). FIG. 2 also shows that second bounding box 220 can be approximately placed around the outline of the glow of flare 201. In some examples, applying first bounding box 210 and second bounding box 220 to the image of flare 201 creates zone 202 (i.e., mostly comprising the flare 201 itself), zone 204 (i.e., mostly comprising the area between the flare 201 and the background), and zone 206 (i.e., the background). The creation of zone 204 can help the perception stack more precisely identify the road flare 201 and also avoid erroneously identifying additional road flares in the glow of road flare 201 that do not exist in the environment. In some examples, the machine learning model is not penalized for identifying additional road flares in the glow of road flare 201 because it understands that it can ignore those erroneous road flares. Therefore, applying two bounding boxes to the road flare image and creating a zone 204, improves the accuracy of the detection and identification of road flares due to their unique nature.

Figure 3:
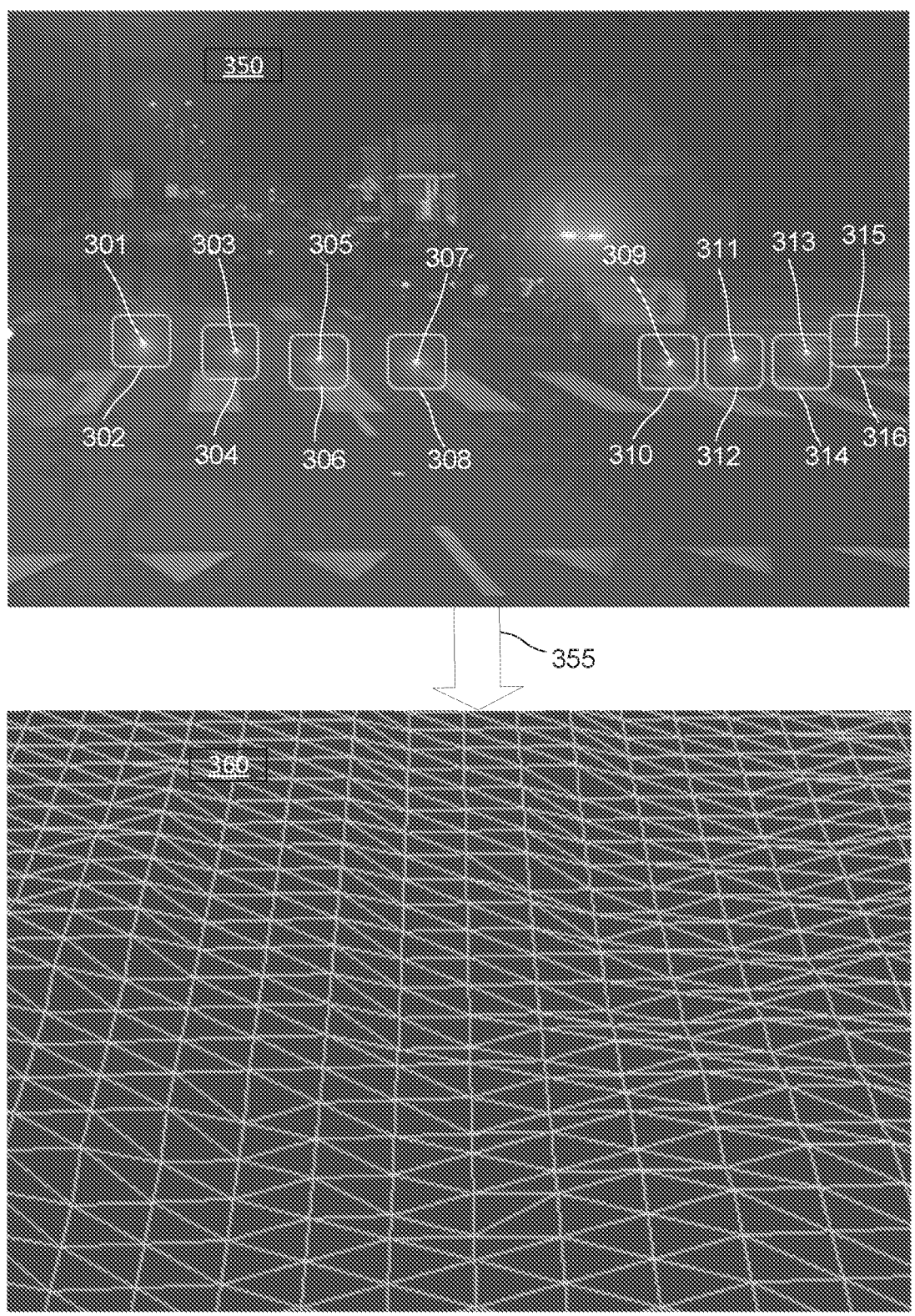
FIG. 3 illustrates an example image overlayed onto an example mesh height map, according to some examples of the present disclosure.

Once the perception stack can accurately detect and identify road flares (i.e., road flares 140, 142, 144, 146, 148, and 150), it is important that the AV 110 knows the exact location of the road flares and also that the AV 110 understands the implications of the placement of the road flares. FIG. 3 illustrates an example image 350 prior to being overlayed onto an example mesh height map 360, that can be used to help the AV 110 determine a 3D position estimation of the locations of the road flares. Specifically, the example image 350 illustrated in FIG. 3 comprises road flares 301, 303, 305, 307, 309, 311, 313, and 315, each bounded by bounding boxes 302, 304, 306, 308, 310, 312, 314, and 316, respectively. Further, mesh height map 360 comprises vectors that indicate the known topology of a specific location. As indicated by arrow 335, example image 350 can be overlayed onto example mesh height map 360 so that the AV 110's controller can determine the precise 3D position estimation of the road flares shown in example image 350. In some examples, the AV 110's controller use this method to determine the price X, Y, and Z coordinates of each road flare illustrated in example image 350. The AV 110's controller can also use pixel depth to determine the precise 3D position estimation of the road flares. In some examples, the machine learning model can predict and add a depth value to each pixel of a sensed image and subsequently estimate the position of the road flares based on this depth.

Figure 4:
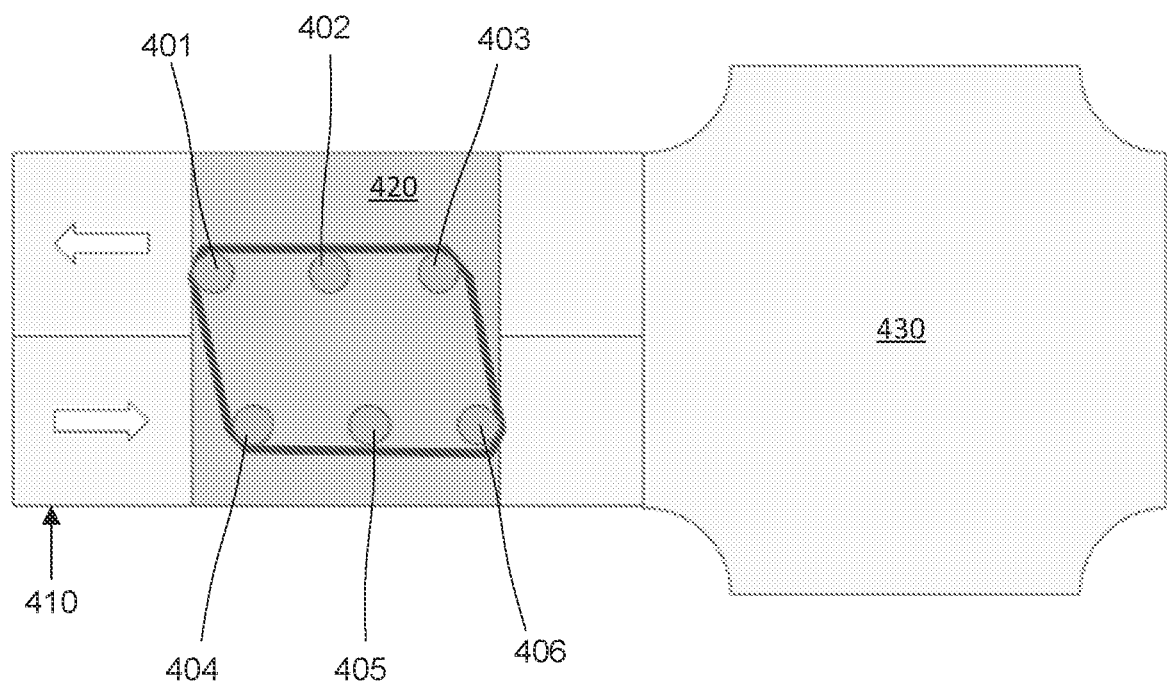
FIG. 4 illustrates an example semantic map comprising road flares, according to some examples of the present disclosure.

Once the AV 110 knows the X, Y, and Z coordinates of the 3D position estimation of the road flares, it is important that the AV 110 understands the implications such as a road closure, for example) of the placement of the road flares. In some examples, the road flares can be placed in a non-uniform arrangement (as illustrated by road flares 140, 142, 144, 146, 148, and 150 illustrated in FIG. 1), and therefore it can be difficult for the AV 110 to understand the real-world purpose of road flares that may appear to be haphazardly placed. In some examples, the 3D position estimation of the road flares can be combined with semantic map information to help determine the real-world purpose (such as a road closure, for example) of the road flares. FIG. 4 illustrates an example semantic map 410 comprising road flares 401-406.

As illustrated in FIG. 4, all six of the road flares 401-406 are positioned within a portion 420 of the roadway just passed intersection 430. This information can be useful to an AV 110 approaching intersection 430 from the right side of the map. The AV 110 can detect the road flares 401-406, determine the 3D position estimation of each road flare 401-406, and then compare the locations of the road flares 401-406 as a group to information contained in semantic map 410. The information in semantic map 410 can tell the AV 110 that these road flares 401-406 are likely placed to indicate that the roadway 420 is blocked to traffic. In some examples, the AV 110 can then re-route its route along a different path or channel to avoid the closed roadway.

Figure 5:
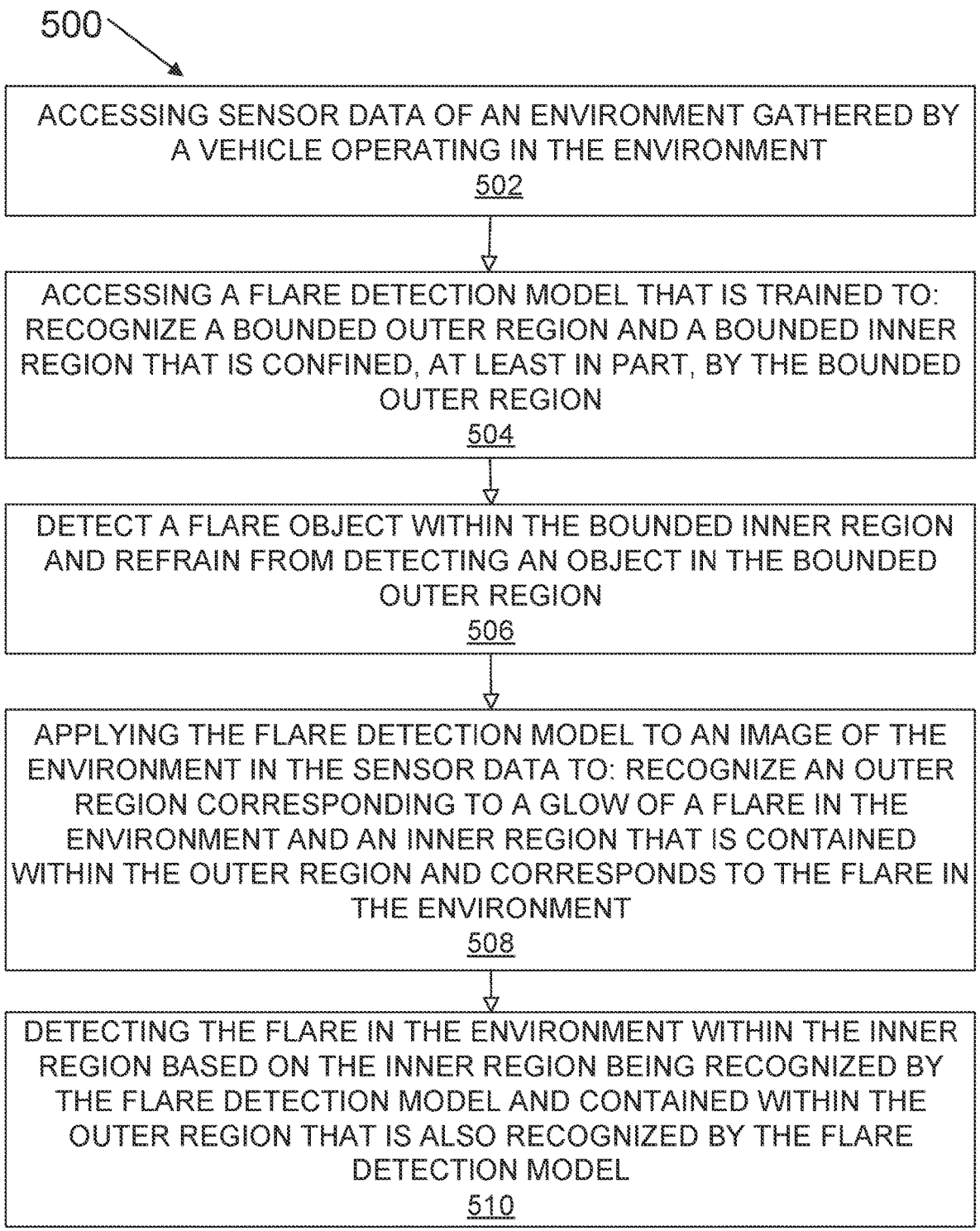
FIG. 5 illustrates an example process for accessing a flare detection model of an autonomous vehicle (AV) to detect a road flare in the environment, according to some aspects of the disclosed technology.

FIG. 5 illustrates an example process 500 for implementing a flare detection model of an autonomous vehicle (AV) to detect a road flare in the environment. At block 502, the process 500 can include accessing sensor data of an environment gathered by a vehicle (e.g., AV 110) operating in the environment. In some examples, the AV 110 can include a sensor system comprising one or more types of sensors that can be arranged about the AV 110, including but not limited to camera sensors (e.g., sensor 130). In some examples, the AV 110 can interpret sensor signals to detect and classify objects in the environment using a perception stack as explained in more detail below.

At block 504, the process 500 can include accessing a flare detection model that is trained to recognize a bounded outer region (e.g., zone 204) and a bounded inner region (e.g., zone 202) that is confined, at least in part, by the bounded outer region. In some examples, a machine learning algorithm can include a flare detection model that can be trained to detect and classify flares by applying two bounding boxes to the detected flare. In some examples, AV 110 can include an AI/ML platform that can provide the infrastructure for training and evaluating machine learning algorithms for operating AV 110. In some examples, a machine learning algorithm can be trained to detect and classify flares by applying two bounding boxes (i.e. bounding box 210 and bounding box 220) to an image of the detected flare as shown in FIG. 2.

At block 506, the process 500 can include detecting a flare object within the bounded inner region (e.g., zone 202) and refrain from detecting an object in the bounded outer region (e.g., zone 204). In some examples, the creation of zone 204 can help the perception stack more precisely identify the road flare 201 and also avoid erroneously identifying additional road flares in the glow (e.g., zone 204) of road flare 201 that do not exist in the environment. In some examples, the machine learning model is not penalized for identifying additional road flares in the glow (e.g., zone 204) of road flare 201 because it understands that it can ignore those erroneous road flares. Therefore, applying two bounding boxes to the road flare image and creating a zone 204, improves the accuracy of the detection and identification of road flares due to their unique nature.

At block 508, the process 500 can include applying the flare detection model to an image of the environment in the sensor data to recognize an outer region (e.g., zone 204) corresponding to a glow of a flare in the environment and an inner region (e.g., zone 202) that is contained within the outer region and corresponds to the flare in the environment. In some examples, the perception stack can apply first bounding box 210 and second bounding box 220 to the image of flare 201 to create zone 202 (i.e., mostly comprising the flare 201 itself), zone 204 (i.e., mostly comprising the area between the flare 201 and the background), and zone 206 (i.e., the background). In some examples, the creation of zone 204 can help the perception stack more precisely identify the road flare 201 and also avoid erroneously identifying additional road flares in the glow (e.g., zone 204) of road flare 201 that do not exist in the environment.

At block 510, the process 500 can include detecting the flare (e.g., flare 201) in the environment within the inner region (e.g., zone 202) based on the inner region being recognized by the flare detection model and contained within the outer region (e.g., zone 204) that is also recognized by the flare detection model. In some examples, the machine learning model is not penalized for identifying additional road flares in the glow (e.g., zone 204) of road flare 201 because it understands that it can ignore those erroneous road flares. Therefore, applying two bounding boxes to the road flare image and creating a zone 204, improves the accuracy of the detection and identification of road flares due to their unique nature.

Figure 6:
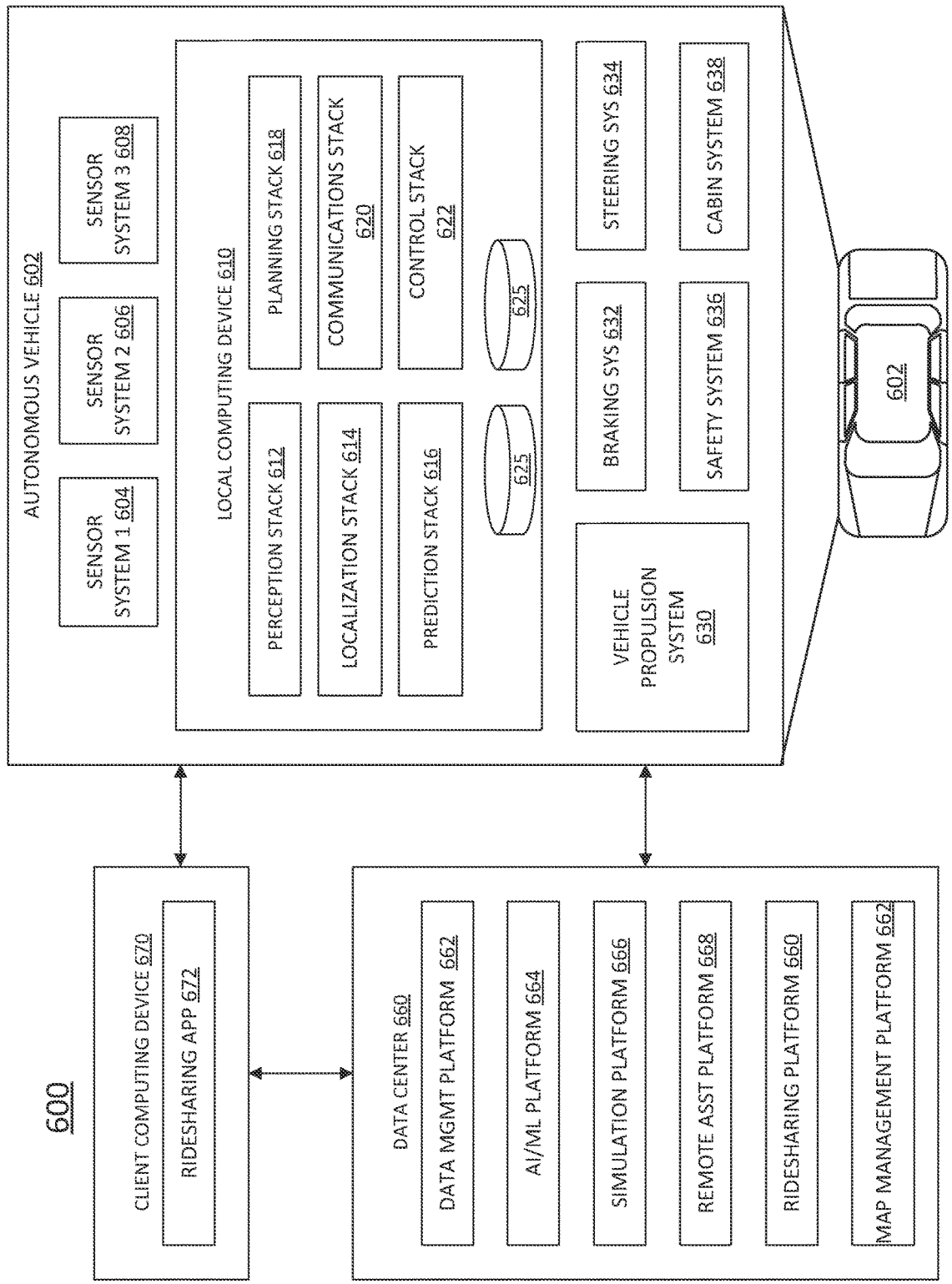
FIG. 6 illustrates an example system environment that can be used to facilitate autonomous vehicle (AV) dispatch and operations, according to some aspects of the disclosed technology.

FIG. 6 is a diagram illustrating an example autonomous vehicle (AV) environment 600, according to some examples of the present disclosure. One of ordinary skill in the art will understand that, for AV environment 600 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 602 can navigate roadways without a human driver based on sensor signals generated by multiple sensor systems 604, 606, and 608. The sensor systems 604-608 can include one or more types of sensors and can be arranged about the AV 602. For instance, the sensor systems 604-608 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other examples may include any other number and type of sensors.

The AV 602 can also include several mechanical systems that can be used to maneuver or operate the AV 602. For instance, the mechanical systems can include a vehicle propulsion system 630, a braking system 632, a steering system 634, a safety system 636, and a cabin system 638, among other systems. The vehicle propulsion system 630 can include an electric motor, an internal combustion engine, or both. The braking system 632 can include an engine brake, brake pads, actuators, and/or any other suitable componentry configured to assist in decelerating the AV 602. The steering system 634 can include suitable componentry configured to control the direction of movement of the AV 602 during navigation. The safety system 636 can include lights and signal indicators, a parking brake, airbags, and so forth. The cabin system 638 can include cabin temperature control systems, in-cabin entertainment systems, and so forth. In some examples, the AV 602 might not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

The AV 602 can include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a localization stack 614, a prediction stack 616, a planning stack 618, a communications stack 620, a control stack 622, an AV operational database 624, and an HD geospatial database 626, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the localization stack 614, the HD geospatial database 626, other components of the AV, and other data sources (e.g., the data center 650, the client computing device 670, third party data sources, etc.). The perception stack 612 can detect and classify objects and determine their current locations, speeds, directions, and the like. In addition, the perception stack 612 can determine the free space around the AV 602 (e.g., to maintain a safe distance from other objects, change lanes, park the AV, etc.). The perception stack 612 can identify environmental uncertainties, such as where to look for moving objects, flag areas that may be obscured or blocked from view, and so forth. In some examples, an output of the perception stack 612 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 614 can determine the AV's position and orientation (pose) using different methods from multiple systems (e.g., GPS, IMUs, cameras, LIDAR, RADAR, ultrasonic sensors, the HD geospatial database 626, etc.). For example, in some cases, the AV 602 can compare sensor data captured in real-time by the sensor systems 604-608 to data in the HD geospatial database 626 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

Prediction stack 616 can receive information from the localization stack 614 and objects identified by the perception stack 612 and predict a future path for the objects. In some examples, the prediction stack 616 can output several likely paths that an object is predicted to take along with a probability associated with each path. For each predicted path, the prediction stack 616 can also output a range of points along the path corresponding to a predicted location of the object along the path at future time intervals along with an expected error value for each of the points that indicates a probabilistic deviation from that point.

Planning stack 618 can determine how to maneuver or operate the AV 602 safely and efficiently in its environment. For example, the planning stack 618 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 602 from one point to another and outputs from the perception stack 612, localization stack 614, and prediction stack 616. The planning stack 618 can determine multiple sets of one or more mechanical operations that the AV 602 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 618 can select from multiple backup plans to carry out. For example, while preparing to change lanes to turn right at an intersection, another vehicle may aggressively cut into the destination lane, making the lane change unsafe. The planning stack 618 could have already determined an alternative plan for such an event. Upon its occurrence, it could help direct the AV 602 to go around the block instead of blocking a current lane while waiting for an opening to change lanes.

Control stack 622 can manage the operation of the vehicle propulsion system 630, the braking system 632, the steering system 634, the safety system 636, and the cabin system 638. The control stack 622 can receive sensor signals from the sensor systems 604-608 as well as communicate with other stacks or components of the local computing device 610 or a remote system (e.g., the data center 650) to effectuate operation of the AV 602. For example, the control stack 622 can implement the final path or actions from the multiple paths or actions provided by the planning stack 618. This can involve turning the routes and decisions from the planning stack 618 into commands for the actuators that control the AV's steering, throttle, brake, and drive unit.

Communications stack 620 can transmit and receive signals between the various stacks and other components of the AV 602 and between the AV 602, the data center 650, the client computing device 670, and other remote systems. The communications stack 620 can enable the local computing device 610 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 620 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 626 can store HD maps and related data of the streets upon which the AV 602 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 624 can store raw AV data generated by the sensor systems 604-608, stacks 612-622, and other components of the AV 602 and/or data received by the AV 602 from remote systems (e.g., the data center 650, the client computing device 670, etc.). In some examples, the raw AV data can include HD LIDAR point cloud data, image data, RADAR data, GPS data, and other sensor data that the data center 650 can use for creating or updating AV geospatial data or for creating simulations of situations encountered by AV 602 for future testing or training of various machine learning algorithms that are incorporated in the local computing device 610.

Data center 650 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 650 can include one or more computing devices remote to the local computing device 610 for managing a fleet of AVs and AV-related services. For example, in addition to managing the AV 602, the data center 650 may also support a ride-hailing service (e.g., a ridesharing service), a delivery service, a remote/roadside assistance service, street services (e.g., street mapping, street patrol, street cleaning, street metering, parking reservation, etc.), and the like.

Data center 650 can send and receive various signals to and from the AV 602 and the client computing device 670. These signals can include sensor data captured by the sensor systems 604-608, roadside assistance requests, software updates, ride-hailing/ridesharing pick-up and drop-off instructions, and so forth. In this example, the data center 650 includes a data management platform 652, an Artificial Intelligence/Machine Learning (AI/ML) platform 654, a simulation platform 656, a remote assistance platform 658, and a ride-hailing platform 660, and a map management platform 662, among other systems.

Data management platform 652 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ride-hailing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

Simulation platform 656 can enable testing and validation of the algorithms, machine learning models, neural networks, and other development efforts for the AV 602, the remote assistance platform 658, the ride-hailing platform 660, the map management platform 662, and other platforms and systems. Simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from a cartography platform (e.g., map management platform 662); modeling the behavior of other vehicles, bicycles, pedestrians, and other dynamic elements; simulating inclement weather conditions, different traffic scenarios; and so on.

Remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

Ride-hailing platform 660 can interact with a customer of a ride-hailing service via a ride-hailing application 672 executing on the client computing device 670. The client computing device 670 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 672. The client computing device 670 can be a customer's mobile computing device or a computing device integrated with the AV 602 (e.g., the local computing device 610). The ride-hailing platform 660 can receive requests to pick up or drop off from the ride-hailing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ride-hailing platform 660 may incorporate the map viewing services into the client application 672 to enable passengers to view the AV 602 in transit en route to a pick-up or drop-off location, and so on.

While the autonomous vehicle 602, the local computing device 610, and the autonomous vehicle environment 600 are shown to include certain systems and components, one of ordinary skill will appreciate that the autonomous vehicle 602, the local computing device 610, and/or the autonomous vehicle environment 600 can include more or fewer systems and/or components than those shown in FIG. 6. For example, the autonomous vehicle 602 can include other services than those shown in FIG. 6 and the local computing device 610 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 6. An illustrative example of a computing device and hardware components that can be implemented with the local computing device 610 is described below with respect to FIG. 8.

Figure 7:
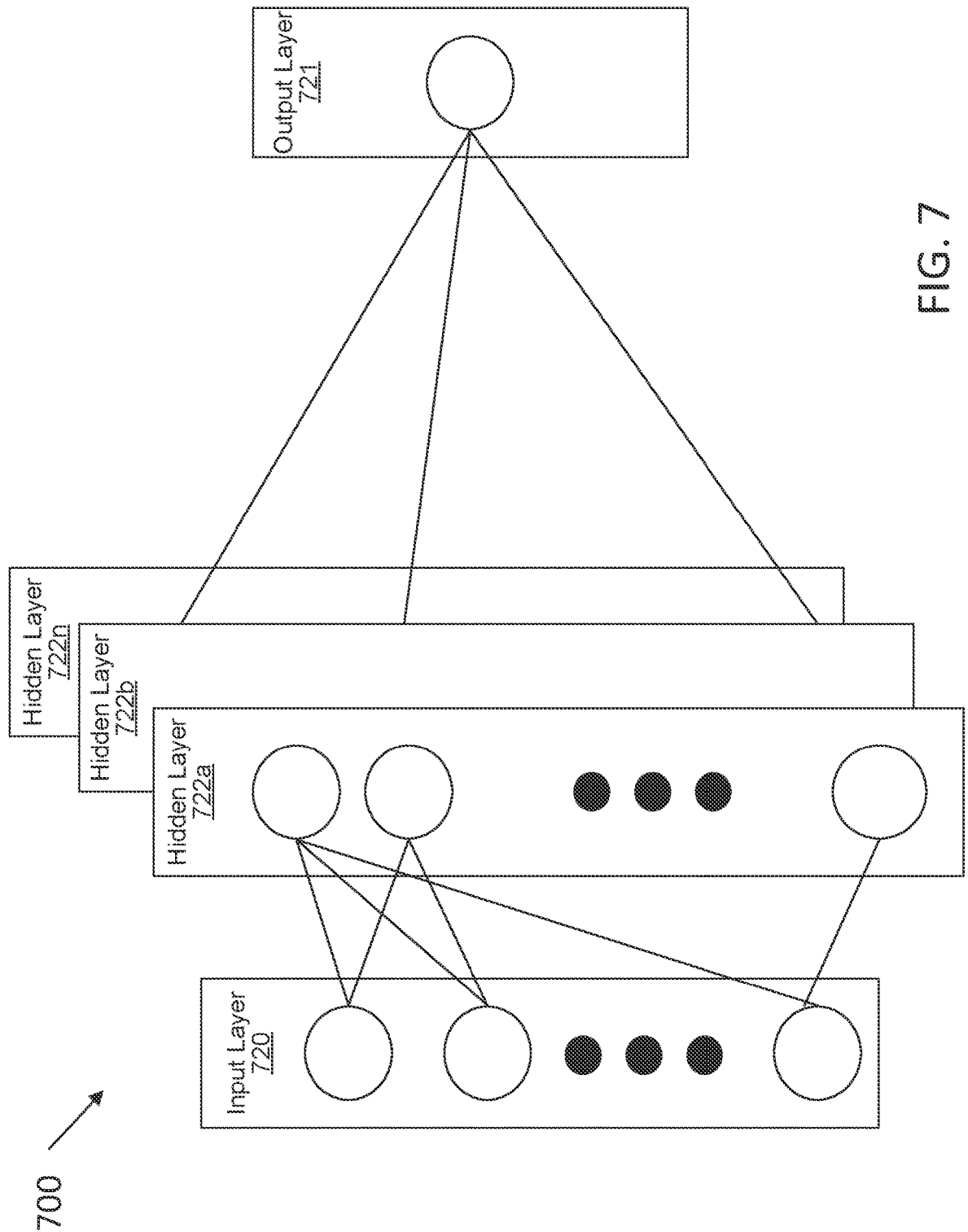
FIG. 7 illustrates an example of a deep learning neural network that can be used to implement a flare detection model, according to some aspects of the disclosed technology.

In FIG. 7, the disclosure now turns to a further discussion of models that can be used through the environments and techniques described herein. FIG. 7 is an example of a deep learning neural network 700 that can be used to implement all or a portion of the systems and techniques described herein (e.g., neural network 700 can be used to implement a flare detection model as discussed above). An input layer 720 can be configured to receive sensor data and/or data relating to an environment surrounding an AV. Neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. Neural network 700 further includes an output layer 721 that provides an output resulting from the processing performed by the hidden layers 722a, 722b, through 722n.

Neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(½ \, (target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
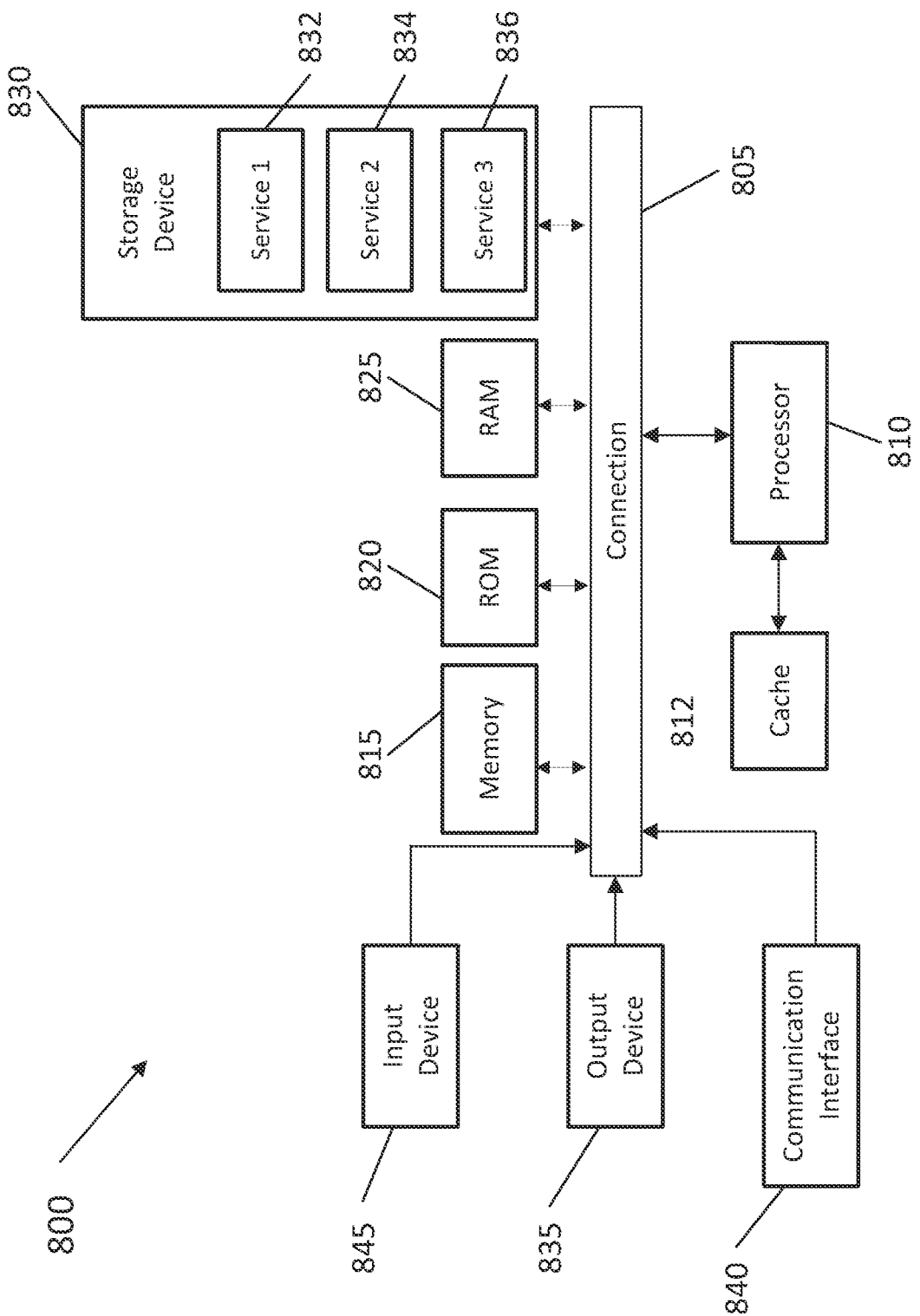
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A method comprising accessing sensor data of an environment gathered by a vehicle operating in the environment; accessing a flare detection model that is trained to recognize a bounded outer region and a bounded inner region that is confined, at least in part, by the bounded outer region; and detect a flare object within the bounded inner region and refrain from detecting an object in the bounded outer region; applying the flare detection model to an image of the environment in the sensor data to recognize an outer region corresponding to a glow of a flare in the environment and an inner region that is contained within the outer region and corresponds to the flare in the environment; and detecting the flare in the environment within the inner region based on the inner region being recognized by the flare detection model and contained within the outer region that is also recognized by the flare detection model.

Aspect 2. The method of Aspect 1, wherein the bounded outer region corresponds to illumination generated by the flare object and the inner region corresponds to the flare object.

Aspect 3. The method of Aspect 1 or 2, further comprising: identifying flares in images from training data; identifying illuminations in the images that are generated by the flares; labeling the illuminations as bounded outer regions in the images; labeling the flares as bounded inner regions in the images; and training the flare detection model with the training data based on the labeling of both the illuminations as bounded outer regions and the flares as bounded inner regions in the images.

Aspect 4. The method of Aspect 3, further comprising refraining from penalizing the flare detection model in predicting flare objects in the bounded outer regions in training the flare detection model with the training data.

Aspect 5. The method of any of Aspects 1 to 4, further comprising determining the location of the flare using localization by overlaying a height map onto an image of the detected flare and determining the coordinates of the detected flare based on known coordinates of the overlayed height map.

Aspect 6. The method of any of Aspects 1 to 5, further comprising determining the location of the flare using pixel depth wherein a neural model predicts the depth of each pixel within an image of the detected flare and uses a determined pixel range and position of the vehicle.

Aspect 7. The method of any of Aspects 1 to 6, further comprising identifying a group of flares, including: identifying more than one flare on a roadway; determining the locations of the more than one flares using localization by overlaying a height map onto an image of the detected flare and determining the coordinates of the detected flare based on known coordinates of the overlayed height map; identifying the locations of the more than one flares on a semantic map; determining, based on the locations of the more than one flares on the semantic map, a pattern of the detected flares.

Aspect 8. The method of Aspect 7, further comprising identifying a traffic directive based on the determined pattern of the detected flares.

Aspect 9. The method of Aspect 8, further comprising determining an alternate channel for the vehicle to travel based on the identified traffic directive.

Aspect 10. A system comprising: at least one memory; and at least one processor coupled to the at least one memory, the at least one processor configured to: access sensor data of an environment gathered by a vehicle operating in the environment; access a flare detection model that is trained to: recognize a bounded outer region and a bounded inner region that is confined, at least in part, by the bounded outer region; and detect a flare object within the bounded inner region and refrain from detecting an object in the bounded outer region; apply the flare detection model to an image of the environment in the sensor data to: recognize an outer region corresponding to a glow of a flare in the environment and an inner region that is contained within the outer region and corresponds to the flare in the environment; and detect the flare in the environment within the inner region based on the inner region being recognized by the flare detection model and contained within the outer region that is also recognized by the flare detection model.

Aspect 11. The system of Aspect 10, wherein the bounded outer region corresponds to illumination generated by the flare object and the inner region corresponds to the flare object.

Aspect 12. The system of Aspect 10 or 11, wherein the at least one processor is further configured to: identify flares in images from training data; identify illuminations in the images that are generated by the flares; label the illuminations as bounded outer regions in the images; label the flares as bounded inner regions in the images; and train the flare detection model with the training data based on the labeling of both the illuminations as bounded outer regions and the flares as bounded inner regions in the images.

Aspect 13. The system of Aspect 12, wherein the at least one processor is further configured to refrain from penalizing the flare detection model in predicting flare objects in the bounded outer regions in training the flare detection model with the training data.

Aspect 14. The system of any of Aspects 10 to 13, wherein the at least one processor is further configured to determine the location of the flare using localization by overlaying a height map onto an image of the detected flare and determine the coordinates of the detected flare based on known coordinates of the overlayed height map.

Aspect 15. The system of any of Aspects 10 to 14, wherein the at least one processor is further configured to determine the location of the flare using pixel depth wherein a neural model predicts the depth of each pixel within an image of the detected flare and uses a determined pixel range and position of the vehicle.

Aspect 16. The system of any of Aspects 10 to 15, wherein the at least one processor is further configured to identify a group of flares, the at least one processor configured to: identify more than one flare on a roadway; determine the locations of the more than one flares using localization by overlaying a height map onto an image of the detected flare and determine the coordinates of the detected flare based on known coordinates of the overlayed height map; identify the locations of the more than one flares on a semantic map; determine, based on the locations of the more than one flares on the semantic map, a pattern of the detected flares.

Aspect 17. The system of Aspect 16, wherein the at least one processor is further configured to identify a traffic directive based on the determined pattern of the detected flares.

Aspect 18. The system of Aspect 17, wherein the at least one processor is further configured to determine an alternate channel for the vehicle to travel based on the identified traffic directive.

Aspect 19. A non-transitory computer-readable storage medium comprising at least one instruction for causing a computer or processor to: access sensor data of an environment gathered by a vehicle operating in the environment; access a flare detection model that is trained to: recognize a bounded outer region and a bounded inner region that is confined, at least in part, by the bounded outer region; and detect a flare object within the bounded inner region and refrain from detecting an object in the bounded outer region; apply the flare detection model to an image of the environment in the sensor data to: recognize an outer region corresponding to a glow of a flare in the environment and an inner region that is contained within the outer region and corresponds to the flare in the environment; and detect the flare in the environment within the inner region based on the inner region being recognized by the flare detection model and contained within the outer region that is also recognized by the flare detection model.

Aspect 20. The non-transitory computer-readable storage medium of Aspect 19, wherein the at least one instruction further causes a computer or processor to: identify flares in images from training data; identify illuminations in the images that are generated by the flares; label the illuminations as bounded outer regions in the images; label the flares as bounded inner regions in the images; and train the flare detection model with the training data based on the labeling of both the illuminations as bounded outer regions and the flares as bounded inner regions in the images.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   accessing sensor data of an environment gathered by a vehicle operating in the environment;
   accessing a flare detection model that is trained to:
   recognize a bounded outer region and a bounded inner region that is confined, at least in part, by the bounded outer region; and
   detect a flare object within the bounded inner region and refrain from detecting an object in the bounded outer region;
   applying the flare detection model to an image of the environment in the sensor data to: recognize an outer region corresponding to a glow of a flare in the environment and an inner region that is contained within the outer region and corresponds to the flare in the environment;

detecting the flare in the environment within the inner region based on the inner region being recognized by the flare detection model and contained within the outer region that is also recognized by the flare detection model;

identifying more than one flare on a roadway;

determining locations of the more than one flares using localization by overlaying a height map onto an image of the detected flare and determining coordinates of the detected flare based on known coordinates of the overlayed height map;

identifying the locations of the more than one flares on a semantic map;

determining, a pattern of the detected flares based on the locations of the more than one flares on the semantic map;

determining, based on the locations of the more than one flares and semantic map information, a purpose of the more than one flares; and altering a route of the vehicle responsive to the pattern of the detected flares and the locations of the more than one flare on the semantic map, and autonomously operating the vehicle along the altered route.

2. The method of claim 1, wherein the bounded outer region corresponds to illumination generated by the flare object and the inner region corresponds to the flare object.

3. The method of claim 1, further comprising: identifying flares in images from training data;
identifying illuminations in the images that are generated by the flares;
labeling the illuminations as bounded outer regions in the images;
labeling the flares as bounded inner regions in the images; and
training the flare detection model with the training data based on the labeling of both the illuminations as bounded outer regions and the flares as bounded inner regions in the images.

4. The method of claim 3, further comprising refraining from penalizing the flare detection model in predicting flare objects in the bounded outer regions in training the flare detection model with the training data.

5. The method of claim 1, further comprising determining a location of the flare using localization by overlaying a height map onto an image of the detected flare and determining coordinates of the detected flare based on known coordinates of the overlayed height map.

6. The method of claim 1, further comprising determining a location of the flare using pixel depth wherein a neural model predicts the depth of each pixel within an image of the detected flare and uses a determined pixel range and position of the vehicle.

7. The method of claim 1, further comprising identifying a traffic directive based on the determined pattern of the detected flares.

8. The method of claim 7, further comprising determining an alternate channel for the vehicle to travel based on the identified traffic directive.

9. A system comprising:
at least one memory; and
at least one processor coupled to the at least one memory, the at least one processor configured to access sensor data of an environment gathered by a vehicle operating in the environment;
access a flare detection model that is trained to:
recognize a bounded outer region and a bounded inner region that is confined, at least in part, by the bounded outer region; and
detect a flare object within the bounded inner region and refrain from detecting an object in the bounded outer region;
apply the flare detection model to an image of the environment in the sensor data to: recognize an outer region corresponding to a glow of a flare in the environment and an inner region that is contained within the outer region and corresponds to the flare in the environment;
detect the flare in the environment within the inner region based on the inner region being recognized by the flare detection model and contained within the outer region that is also recognized by the flare detection model;
identifying more than one flare on a roadway;
determining locations of the more than one flares using localization by overlaying a height map onto an image of the detected flare and determining coordinates of the detected flare based on known coordinates of the overlayed height map;
identifying the locations of the more than one flares on a semantic map;
determining, a pattern of the detected flares based on the locations of the more than one flares on the semantic map;
determining, based on the locations of the more than one flares and semantic map information, a purpose of the more than one flares; and
altering a route of the vehicle responsive to the pattern of the detected flares, the purpose of the detected flares, and the locations of the more than one flare on the semantic map, and autonomously operating the vehicle along the altered route.

10. The system of claim 9, wherein the bounded outer region corresponds to illumination generated by the flare object and the inner region corresponds to the flare object.

11. The system of claim 9, wherein the at least one processor is further configured to:
identify flares in images from training data;
identify illuminations in the images that are generated by the flares;
label the illuminations as bounded outer regions in the images;
label the flares as bounded inner regions in the images; and
train the flare detection model with the training data based on the labeling of both the illuminations as bounded outer regions and the flares as bounded inner regions in the images.

12. The system of claim 11, wherein the at least one processor is further configured to refrain from penalizing the flare detection model in predicting flare objects in the bounded outer regions in training the flare detection model with the training data.

13. The system of claim 9, wherein the at least one processor is further configured to determine a location of the flare using localization by overlaying a height map onto an image of the detected flare and determine coordinates of the detected flare based on known coordinates of the overlayed height map.

14. The system of claim 9, wherein the at least one processor is further configured to determine a location of the flare using pixel depth wherein a neural model predicts the depth of each pixel within an image of the detected flare and uses a determined pixel range and position of the vehicle.

15. The system of claim 9, wherein the at least one processor is further configured to identify a traffic directive based on the determined pattern of the detected flares.

16. The system of claim 15, wherein the at least one processor is further configured to determine an alternate channel for the vehicle to travel based on the identified traffic directive.

17. A non-transitory computer-readable storage medium comprising at least one instruction for causing a computer or processor to:
  access sensor data of an environment gathered by a vehicle operating in the environment;
  access a flare detection model that is trained to:
  recognize a bounded outer region and a bounded inner region that is confined, at least in part, by the bounded outer region; and
  detect a flare object within the bounded inner region and refrain from detecting an object in the bounded outer region;
  apply the flare detection model to an image of the environment in the sensor data to: recognize an outer region corresponding to a glow of a flare in the environment and an inner region that is contained within the outer region and corresponds to the flare in the environment;
  detect the flare in the environment within the inner region based on the inner region being recognized by the flare detection model and contained within the outer region that is also recognized by the flare detection model;
  identifying more than one flare on a roadway;
  determining locations of the more than one flares using localization by overlaying a height map onto an image of the detected flare and determining coordinates of the detected flare based on known coordinates of the overlayed height map;
  identifying the locations of the more than one flares on a semantic map;
  determining, a pattern of the detected flares based on the locations of the more than one flares on the semantic map;
  determining, based on the locations of the more than one flares and semantic map information, a purpose of the more than one flares; and
  altering a route of the vehicle responsive to the pattern of the detected flares, the purpose of the detected flares, and the locations of the more than one flare on the semantic map, and autonomously operating the vehicle along the altered route.

18. The non-transitory computer-readable storage medium of claim 17, wherein the at least one instruction further causes a computer or processor to:
  identify flares in images from training data;
  identify illuminations in the images that are generated by the flares;
  label the illuminations as bounded outer regions in the images;
  label the flares as bounded inner regions in the images; and
  train the flare detection model with the training data based on the labeling of both the illuminations as bounded outer regions and the flares as bounded inner regions in the images.

\* \* \* \* \*